United States Patent Office 3,759,788
Patented Sept. 18, 1973

3,759,788
REDUCING BLOOD CLOTTING WITH ANTI-THROMBOGENIC MATERIALS CONTAINING QUATERNARY PHOSPHONIUM SALTS
Henry Martin Gajewski, Winnetka, and Clarence John Gdowski, Buffalo Grove, Ill., assignors to Baxter Laboratories, Inc., Morton Grove, Ill.
No Drawing. Filed Dec. 8, 1969, Ser. No. 883,295
Int. Cl. C12b *3/00, 9/00*
U.S. Cl. 195—1.8                   12 Claims

ABSTRACT OF THE DISCLOSURE

Reduced blood clotting is found upon the utilization of antithrombogenic materials which comprise an organic plastic having dispersed on its surface, in a pharmacologically acceptable concentration, a quaternary phosphonium salt of a strong acid which is generally insoluble in saline solution.

BACKGROUND OF THE INVENTION

A long standing need for materials which are antithrombogenic has been partially met through the use of silicon elastomers and by coating organic and inorganic materials with heparin. Such materials are fabricated into medical devices such as tubing and membranes for contacting blood and used in medical and surgical equipment such as heart-lung machines, artificial kidneys, and organ perfusion devices. Other medical devices such as catheters are also fabricated from such materials. It is, of course, most important that the rate of clotting of blood which comes into contact with these devices be kept to a minimum.

At the present time, silicon rubber is the least thrombogenic of the known plastic materials, but its rate of blood clotting is higher than would be ideally desired. Organic plastics such as silicon rubber which have heparin bonded to them are substantially improved in their antithrombogenic characteristics. However, the heparin has a tendency to deactivate or to come off the surface of the plastic with prolonged use, which causes a substantial decrease in the antithrombogenic characteristics.

Accordingly, there is a need for a material having improved antithrombogenic characteristics over simple materials such as silicone rubber, yet which exhibits superior antithrombogenic characteristics over a longer term than other similar materials which are currently known to the art.

DESCRIPTION OF THE INVENTION

In accordance with this invention, a medical device having superior and long lasting antithrombogenic characteristics is made from a material which comprises an organic plastic having dispersed on its surface a pharmacologically acceptable concentration of a quaternary phosphonium compound of the formula $R_3R'PX$ which is generally insoluble in isotonic saline solution (generally called "saline"), in which R is a monovalent aryl-containing hydrocarbon radical, R' is a monovalent hydrocarbon radical and X is an anion of a strong acid.

While the above insoluble compound can be applied to the surface of organic plastics, it is preferred for the material used to fabricate medical devices to comprise an intimate mixture of 100 parts by weight of an organic plastic and from 0.2 to 2 parts by weight, and usually from 0.5 to 1.5 parts by weight, of the above defined insoluble compound. It is preferable to use those insoluble compounds which are essentially no more soluble in saline than the compound benzyltriphenylphosphonium chloride.

The above mixture provides a medical device which always has the insoluble phosphonium compound dispersed on its surface, no matter how much wearing and abrasion takes place at the surface. As the surface of the device is worn away, new organic plastic and associated phosphonium compound is exposed.

The medical devices made by mixing the above phosphonium compound with an organic plastic not only exhibit superior antithrombogenic activity upon initial use, but the superior characteristics tend to continue for an indefinite period of time.

Any organic plastic is suitable for use in this invention as long as it is kept below a temperature at which the organic plastic reacts with the insoluble phosphonium compound selected for use. In the case of silicone elastomer stocks, the phosphonium compounds used herein are generally sufficiently non-reactive so that the materials can be heat cured at the customary temperatures. Other suitable materials are thermoplastic formulations such as polyethylene, polypropylene, polystyrene, polyesters such as ethylene terephthalate, cellulose acetate, nylon, polyacrylates such as polymethylmethacrylate and polyethylacrylate, polycarbonates, and the like. Elastomers and elastomer stocks are also intended to be included in the term "organic plastic" and include materials such as polyisoprene, polybutadiene, poly(styreneacrylonitrile) poly-(styrenebutadiene), E.P.T. rubber, polyurethane rubber, butyl rubber, and poly(butadiene-acrylonitrile).

Silicon elastomers containing polymer units such as dimethylsiloxane, phenylmethylsiloxane, 3,3,3-trifluoropropylmethylsiloxane, octylmethylsiloxane, methylhydrogensiloxane, and/or methylvinylsiloxane are also useable in this invention as the "organic plastic."

Halogenated plastics such as polyvinyl chloride or polychloroprene are also usable, although they tend to be reactive with the phosphonium compounds used herein at elevated temperatures and thus may desirably be formulated by dispersion in a solvent and evaporation.

Thermosetting resins are also suitable for mixing with the insoluble phosphonium compounds described above, e.g. alkyd resins such as glycerol terephthalate, epoxy resins, drying oil resins such as linseed oil resin, melamine resins, phenolic resins, silicon resins, and the like.

Compositions which comprise silicones or polyurethanes mixed with the phosphonium compounds used in this invention are generally preferred.

The term "organic plastic" is intended to include plastic formulations containing fillers, crosslinking agents, stabilizers, plasticizers, and the like.

R, as defined above, can be any monovalent aryl-containing hydrocarbon radical such as phenyl, xenyl, naphthyl, tolyl, benzyl, or 2-phenylpropyl. R' can be any monovalent hydrocarbon radical, preferably of at least 4 carbon atoms, such as butyl, hexyl, allyl, cyclopentenyl, 2-phenylpropyl, phenyl, xenyl, octyl, or octadecyl.

X can be an anion of any strong acid, i.e. any acid which is as strong as or stronger in terms of pH than lactic acid, e.g. bromide, chloride, iodide, tartrate, citrate, lactate, or sulphate. Preferably, X is selected to be of such acidity that it forms a salt with the selected phosphonium compound having a pH similar to benzyltriphenylphosphonium chloride under equivalent conditions. X is preferably the chloride ion. R' is preferably a monovalent aryl-containing hydrocarbon radical.

Examples of phosponium salts suitable for use herein are benzyltriphenylphosphonium bromide, tribenzyloctylphosphonium citrate, triphenylcyclohexylphosphonium chloride, dixenylditolylphosphonium sulfate, tetraphenylphosphonium chloride, tris(2-phenylpropyl)butylphosphonium tartrate, triphenyloctadecylphosphonium chloride.

The medical devices of this invention can comprise tubing and containers for the transport and holding of blood, for example, in conjunction with artificial organs such as artificial hearts, organ perfusion devices, heart-lung machines and artificial kidneys or other blood contacting parts used therein such as membranes. Structural blood contacting parts of such devices and their subsystems such as heat exchanger assemblies can also be made in accordance with this invention. The devices of this invention can also constitute catheters for temporary implantation in the body as well as other medical and surgical devices.

The medical devices of this invention have superior antithrombogenic characteristics. Moreover, the superior antithrombogenic characteristics of the devices of this invention are normally not lost because of the degradation of any surface coating such as heparin, because the devices of this invention can be rendered inherently highly antithrombogenic without the use of any surface coating. Thus, the devices of this invention can be brought into contact with blood to perform their intended function with reduced clotting at their surfaces.

The following examples are for illustrative purposes only, and are not intended to limit the scope of the invention of this application.

Example 1

An uncured silicone elastomer stock was prepared from 100 parts by weight of a commercial dimethylpolysiloxane elastomer grade gum containing a small percentage of vinyl-containing siloxane units; 10 parts by weight of a commercial silicone elastomer softening agent (Dow Corning S-2229, a formulation containing a silica filled hydroxyl end blocked dimethylpolysiloxane fluid); 30 parts by weight of finely divided silica filler; 10 parts by weight of a finely divided silica filler previously treated with trimethylchlorosilane; and 1.5 parts by weight of 2,4-dichlorobenzoyl peroxide as a curing catalyst.

To this was added 1.5 parts by weight of benzyltriphenylphosphonium chloride, dissolved in hot, absolute ethanol to provide about a 1 weight percent concentration of the phosphonium compound in the elastomer stock. This formulation was milled until thoroughly mixed, extruded into tubing having an inner diameter of 0.113 inch, cured for five minutes at 200° to 220° F., and post-cured for four hours at 310° F.

A four-foot length of the above tubing was filled with saline solution, which was then replaced with fresh blood taken from a dog in a manner to exclude the blood from contact with the air. The tubing was then sealed into short sections and maintained in a 37° C. water bath. Each section was then opened at successively timed intervals to determine the time of blood clotting.

The above described test was also performed upon silicone rubber tubing prepared from the same formulation and under the same conditions as the tubing described above, except that no benzyltriphenylphosphonium chloride was included.

Upon testing two separate lengths of tubing containing the above phosphonium chloride, the clotting time in one instance was 180 minutes and in the other instance 120 minutes. Testing of several control samples of the silicone rubber tubing which did not contain the phosphonium chloride yielded clotting times ranging between about 30 and 60 minutes.

The same silicone rubber formulation containing the above phosphonium chloride has been observed to be readily implantable in living tissue without causing a substantial tissue reaction.

Example 2

More silicone rubber tubing was prepared in the manner of Example 1, except that only 0.5 part by weight of benzyltriphenylphosphonium chloride was added to the formulation. After curing, testing in the manner of Example 1 yielded an average clotting time of 75 minutes for three separate pieces of tubing.

Example 3

A formulation consisting of the following was prepared: 50 grams of a 35 weight percent dispersion of a thermoplastic polyurethane polymer in a volatile solvent (Rucothane CO-67 sold by the Hooker Chemical Company); 125 grams of methylethylketone; and 0.175 gram of benzyltriphenylphosphonium chloride.

Tubing made of a vinyl chloride polymer plastisol was dipped in the resulting mixture and allowed to air-dry to provide a solid polyurethane coating upon the vinyl tubing. The resulting tubing was then tested for nonthrombogenic characteristics in the manner of Example 1.

Two separate pieces of the above tubing yielded clotting times of 105 minutes and 120 minutes respectively. Under the same test, polyvinylchloride tubing yields clotting times of 30 to 50 minutes.

Example 4

Generally equivalent results to those of Example 1 are obtained when catheters are prepared from 100 parts by weight of natural latex mixed with 0.7 part by weight of triphenyldodecylphosphonium chloride.

Example 5

When 100 parts by weight of a commercial silicone elastomer stock, based on a polymer comprising dimethylsiloxane units and 3,3,3-trifluoropropylmethylsiloxane units, are intimately mixed with 1.3 parts by weight of benzyltriphenylphosphonium chloride, tubing, and other medical devices made from the resulting mixture exhibit improved antithrombogenic characteristics when compared with the same silicone elastomer stock free of benzyltriphenylphosphonium chloride.

What is claimed is:

1. The process comprising bringing into contact with blood a medical device made from material which comprises an organic plastic, said plastic having dispersed on its surface in an effective antithrombogenic concentration a generally saline-insoluble quaternary phosphonium compound of the formula $R_3R'PX$ in which R is a monovalent radical selected from the group consisting of aryl, aralkyl, and alkaryl radicals, R' is a monovalent hydrocarbon radical, and X is an anion of an acid which is at least as strong in terms of pH as lactic acid, whereby said device functions with reduced clotting of blood at said surface.

2. The process of claim 1 in which said device is made from a material which comprises an intimate mixture of 100 parts by weight of an organic plastic and from 0.2 to 2 parts by weight of said quaternary phosphonium compound.

3. The The process of claim 2 in which said medical device is tubing for the transport of blood.

4. The process of claim 2 in which X is the chloride ion.

5. The process of claim 4 in which R is phenyl.

6. The process of claim 5 in which R' is a monovalent radical selected from the group consisting of aryl, aralkyl, and alkaryl radicals.

7. The process of claim 6 in which said compound is benzyltriphenylphosphonium chloride.

8. The process of claim 2 in which said organic plastic comprises an organosilicon elastomer.

9. The process of claim 8 in which said organic plastic comprises a dimethylpolysiloxane-based elastomer.

10. The process of claim 9 in which said compound is benzyltriphenylphosphonium chloride.

11. The process of claim 2 in which said organic plastic comprises a polyurethane elastomer.

12. The process of claim 11 in which said compound is benzyltriphenylphosphonium chloride.

References Cited
FOREIGN PATENTS
875,780    8/1961    Great Britain.

ALBERT T. MEYERS, Primary Examiner
A. P. FAGELSON, Assistant Examiner

U.S. Cl. X.R.
117—138.8 B; 128—214 R, Dig 22; 195—1.7; 424—198

UNITED STATES PATENT OFFICE
CERTIFICATE OF CORRECTION

Patent No. 3,759,788          Dated September 18, 1973

Inventor(s) Henry Martin Gajewski and Clarence John Gdowski

It is certified that error appears in the above-identified patent and that said Letters Patent are hereby corrected as shown below:

Column 6, under "References Cited" insert--

UNITED STATES PATENTS

| | | | |
|---|---|---|---|
| 3,281,365 | 10/66 | Moedritzer | 424-198 |
| 3,365,728 | 1/68 | Edwards | 424-183XR |
| 3,475,358 | 10/69 | Bixter | 424-183XR |
| 3,508,959 | 4/70 | Krahnke | 424-183UR -- |

Column 6, line 5 after "Great Britain" insert--

| | | |
|---|---|---|
| 1,459,646 | 10/66 | France |
| 933,776 | 10/55 | Germany |

OTHER REFERENCES

Shepard, et al: Arch. Biochem. Biophy, Vol. 50, 1954, pp. 224-6.
Chem. Abs., Vol. 47, 1953, pp. 619i.--

Signed and sealed this 4th day of March 1975.

(SEAL)
Attest:

RUTH C. MASON
Attesting Officer

C. MARSHALL DANN
Commissioner of Patents
and Trademarks